Dec. 21, 1937. J. F. KÖHNKE 2,103,010
WALL CONNECTER
Filed March 21, 1936
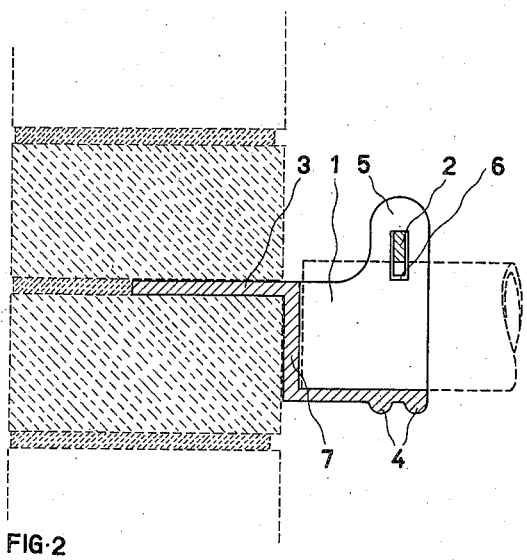
FIG·2
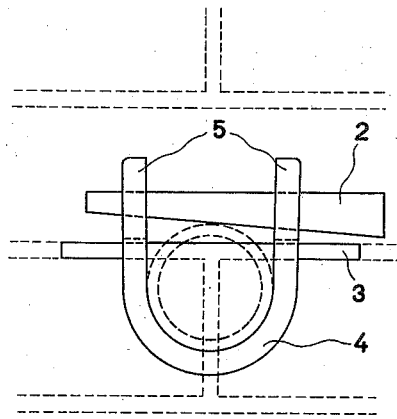
FIG·3
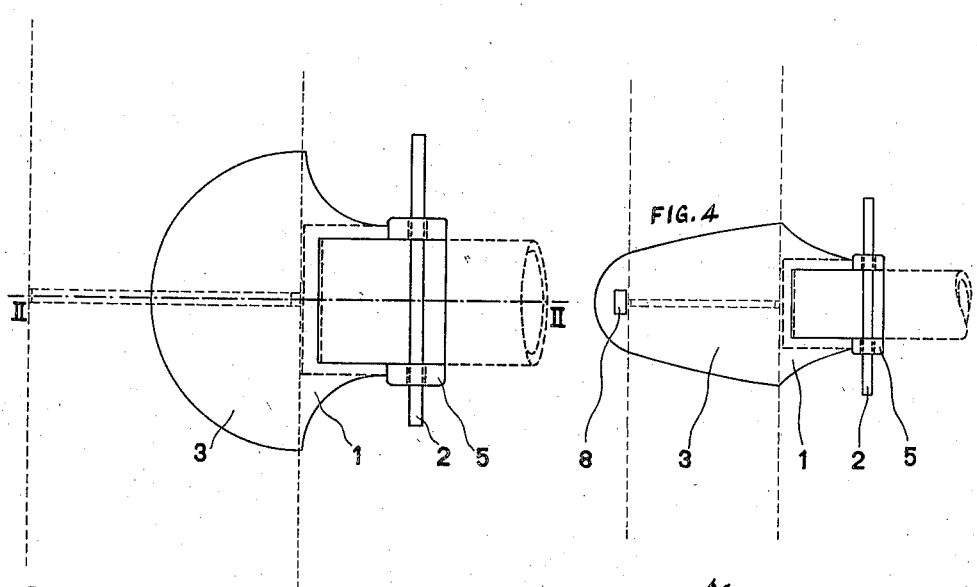
FIG·1  FIG.4

Patented Dec. 21, 1937

2,103,010

UNITED STATES PATENT OFFICE 2,103,010

WALL CONNECTER

Johan Friedrich Köhnke, Haarlem, Netherlands

Application March 21, 1936, Serial No. 70,039
In the Netherlands April 2, 1935

2 Claims. (Cl. 72—108)

The invention relates to wall connecters for scaffolding girders of the kind comprising a supporting member provided with a clamping plate by which the supporting member can be clamped into the wall between parts of which the clamping plate is gripped, and having a socket for receiving the scaffolding member, the socket taking a bearing on the wall.

According to the invention the connecter consists of a supporting member preferably of steel provided with a clamping plate by which the supporting member can be clamped in the wall between parts of which it is gripped, said supporting member comprising a bearing chamber forming a unit with the clamping plate, and being open at one longitudinal side and having two projecting lips with openings arranged in such a way that a locking wedge employed as locking means can be driven into these openings so as to clamp a scaffolding girder disposed in the bearing chamber.

Other features of the invention are hereinafter fully described and claimed in the appended claims.

Preferably the clamping plate according to the invention is of a thickness which almost corresponds with the thickness of joint between the elements, of which the wall is built up, and the supporting member is provided with a supporting wall which is perpendicular to the clamping plate in such a way that when the clamping plate is fully gripped in the wall the supporting wall lies against the wall face. This supporting wall also forms a closing wall of the bearing chamber.

The bearing chamber of the supporting member at one longitudinal side is wholly open and at that side two projecting lips with rectangular openings are arranged in such a way that a locking wedge used as a locking means can be driven into these openings and is able to clamp a scaffolding girder arranged in the bearing chamber.

It is possible to give the clamping plate a half circular form where it enters the wall, so that when it is no longer required in the wall it can be removed easily by a turning movement.

According to the invention the width of the clamping plate can be such that a part of the plate projects at the other side of the wall when the supporting member with the supporting plate is arranged against the wall, whilst in the clamping plate an opening is arranged, which in that position of the supporting member is situated partly outside the wall. By arranging and driving in of a fastening wedge in the free part of the opening the supporting member can then also be fixed unslidably in a direction perpendicular to the wall.

Two embodiments of a wall connecter according to my invention for steel scaffoldings are illustrated in the drawing. There is shown in dotted lines a part of a tubular scaffolding girder arranged in the wall connecter.

In the drawing
Fig. 1 is a plan view.
Fig. 2 is a vertical section on the line II—II in Fig. 1.
Fig. 3 is a view facing the wall.
Fig. 4 illustrates a modified form.

Referring to the drawing and first to Figs. 1 to 3, the wall connecter consists of a supporting member 1 and a wedge 2. The supporting member 1 has a half circular clamping plate 3, which forms a unit with a bearing chamber 4, which is open at the upper side for a scaffolding girder to be supported. At the upper side the bearing chamber 4 has two projecting lips 5 provided with openings 6, through which the wedge 2 can be inserted. At the side of the clamping plate 3 the bearing chamber 4 is closed by a supporting plate 7, which is perpendicular to the clamping plate 3.

The use of the wall connecter is very simple. In existing walls the joint in which the wall connecter must be arranged is chiselled out or otherwise removed so that the clamping plate 3 can be inserted between the bricks until the supporting plate 7 rests against the wall face. If necessary the clamping plate 3 can be clamped in the joint by a small wedge of wood or steel. After one end of a scaffolding girder has been laid in the bearing chamber 4 this girder is firmly fixed therein with the help of the wedge 2, which is driven through the holes 6. The wall connecter is thus clamped in the wall and the scaffolding girder firmly secured in the wall connecter.

The clamping plate may also be of such width as to project on the other (inner) side of the wall. In that case an opening may be provided in the plate as indicated at 8 in Fig. 4 for the reception of a cotter, whereby the plate is prevented from being withdrawn from the wall.

In new walls the wall connecter with its clamping plate 3 can be simply bricked in the wall during construction of the wall. In a very simple manner the wall connecter can afterwards be disconnected from the wall after the scaffolding girder has been taken out. The circular clamping plate makes it possible to loosen the connecter from the joint by a turning movement if simply drawing out is difficult.

Particularly for steel scaffoldings the wall connecter according to the application is of great value. The device is very cheap, can be very easily put into position and produces an excellent, secure and very strong support by the clamping in of the clamping plate 3. The wall itself is not damaged at all, neither in fixing the device nor by removing it, since in a simple manner the joint can be stopped up again. On account of the absence of screw and like fixing means the wall connecter can be put into position very quickly but nevertheless with absolute security and the scaffolding girder can be firmly fixed therein. The connecter can even be used without difficulty for old walls which are in a less good state because the scaffolding as it were is held in position by the weight of the walls above the clamping plates and of the load arranged thereon.

Thus the wall connecter is very suitable for fixing scaffoldings to be hung freely on the wall which especially in case of repairs of parts of high buildings is of very great importance as experience has shown.

I wish it to be understood that I do not desire to be limited to the exact details of construction shown and described for obvious modifications will occur to a person skilled in the art.

I claim:

1. A joist supporting bracket comprising in combination, a socket of U-section formed with a bottom, two side walls and a rear wall, and a supporting plate fixed to the top of said side and rear walls and extending at right angles to the rear wall, said plate being of greater width than said socket, and bracing members extending from said plate towards the side walls of said socket.

2. The joist supporting bracket of claim 1, in combination with substantially vertical extensions of the side walls and means forming part of said extensions for fixing the end of the joist in said bracket.

JOHAN FRIEDRICH KÖHNKE.